United States Patent [19]

Moraru et al.

[11] Patent Number: 5,404,492
[45] Date of Patent: Apr. 4, 1995

[54] HEAD DISK ASSEMBLY SIMULATOR

[75] Inventors: Alex Moraru, Fremont; Bill R. Baker, Redwood City, both of Calif.

[73] Assignee: Helios Incorporated, Sunnyvale, Calif.

[21] Appl. No.: 886,964

[22] Filed: May 21, 1992

[51] Int. Cl.$^6$ .......................................... G06F 9/455
[52] U.S. Cl. ................... 395/500; 364/578; 364/232.3; 364/927.81
[58] Field of Search .................. 395/500; 364/927.81, 364/232.3

[56] References Cited

U.S. PATENT DOCUMENTS

| | | | |
|---|---|---|---|
| 4,727,512 | 2/1988 | Birkner et al. | 395/500 |
| 5,070,474 | 12/1991 | Tuma et al. | 395/500 |
| 5,226,168 | 7/1993 | Kobayashi et al. | 395/800 |

OTHER PUBLICATIONS

Ruiz et al; A Numerical Simulation of the Head-Disk Assembly in Magnetic Hard Disk Files; ASME Journal of Tribology; vol. 112; Parts I, II; pp. 593–613; Oct. 1990.
Shih et al; Modeling and Design Analysis of a Workstation LAN Server; 1991 International Symp. on VLSI Technology; May 22, 1991; pp. 329–333.
Williams; Monte Carlo Simulation of Thin Film Head Read-Write Performance; IEEE Transactions on Magnetics, vol. 26, No. 6, Nov. 1990 pp. 3022–3026.
Cha et al.; Numerical Simulation and Animation of Head Disk Assembly Dynamics; IEEE Trans. on Mag., vol. 27, No. 6, Nov. 1991, pp. 5136–5138.
Hermann; Volterra Modeling of Digital Magnetic Saturation Recording Channels; IEEE Trans. on Mag., vol. 26, No. 5, Sep. 1990, pp. 2125–2127.

*Primary Examiner*—David Y. Eng
*Assistant Examiner*—Kenneth R. Coulter
*Attorney, Agent, or Firm*—Thomas E. Schatzel

[57] ABSTRACT

An embodiment of the present invention is a head disk assembly (HDA) simulator that outputs a flexible, totally electronic simulation of an HDA. It outputs a programmable standard HDA signal. As such the HDA simulator generates the head signal that a functioning, already servo-written HDA would provide. This signal can be ideal, eliminating any anomalies and inconsistencies inherent in electromechanical devices. Quantifiable amounts of anomalies can be systematically introduced to allow design margin testing. The HDA simulator is controlled in two ways. First, by allowing a user to choose items from four menus. And second, by allowing the user to use a built-in text editor to edit ASCII files that control the servo patterns and simulator operation. Independent channels of repetitive signals are available to specify sync, servo and data patterns. For any given simulated head position, simulated adjacent tracks are generated and then mixed-in at an appropriate ratio. Signals that are unique to each track are also available, to accommodate special requirements such as Grey code.

13 Claims, 4 Drawing Sheets

HEAD DISK ASSEMBLY SIMULATOR

BACKGROUND OF THE INVENTION

1. Field of the Invention

The invention relates generally to signal generators and specifically to instruments capable of simulating the complex signals that a servowritten head disk assembly (HDA) would produce during seek and read operations.

2. Description of the Prior Art

Traditionally, development of hard disk drive electronics has been delayed until after two critical phases were completed. First, the manufacture of the disk drive electromechanical assembly, and second, the development of a corresponding servowriter. The drive housing with actuator, head and media all had to exist, and the servowriter had to be able to write the respective servo patterns, on the disk(s) before the servo electronics could be tested and debugged. Designers of servo-based floppy, optical and Winchester drives must wait to develop the servo electronics until the actual head disk drive mechanism is built. Later in production, drive electronics are conventionally tested by connecting up a test HDA, or by testing with the target drive mechanics. This method depends on an assumed "normalcy" of the particular HDA, which actually has its own unique characteristics that are not readily controllable.

An instrument is needed that will permit test and debug of the drive electronics with the initial servo system design, to avoid the four to six month wait normally required. Such an instrument should also be able to be used in a manufacturing process to test electronic circuit boards safely before mating them with a costly HDA. The simulator should be programmable to simulate various conditions, including worst-case mechanical characteristics, to test the tolerance electronics and its capability to recover. By testing the boards under worst case conditions, the electronics design and production process can be optimized to result in higher product quality, reliability and yields.

SUMMARY OF THE PRESENT INVENTION

It is therefore an object of the present invention to provide a HDA simulator that can realistically simulate the composite servo signal output of a HDA as though the signal was actually derived from reading the servo pattern from a real disk surface. The creation of such a signal is unique because it simulates the real-world situation where a drive head reads two adjacent tracks simultaneously as if positioning between them. Each track channel is used for position reference. The channels exhibit a variability in the ratio of its constituents when "moving" that indicates head position and travel, thus the servo signal simulates the drive head both while staying on track and in seek mode. The HDA simulator is fully programmable to mimic a targeted, and perhaps not yet fully realized head disk assembly, including the head positioner, mechanical characteristics, and the movement of the read/write head across the media. The designer/user is able to program-in a seek profile, a repeatable runout, a set of media defects, gain, modulation, spindle variations, positioner characteristics and a set of servo patterns. The drive's servo patterns can be manipulated down to the single transition level. The designer can also simulate closed loop feedback operation. Mechanical phenomena, idiosyncrasies, and anomalies can also be simulated, observed and studied.

Briefly, an embodiment of the present invention is a head disk assembly (HDA) simulator that outputs a flexible, totally electronic simulation of a real, or soon to be real HDA. It outputs a programmable standard HDA signal. As such, the HDA simulator mimics the head signal that a functioning, already servo-written HDA would generate. The HDA simulator is controllable in two ways. First, by allowing a user to choose items from four menus; and second, by allowing the user to use a built-in text editor to edit ASCII files that control the servo patterns and simulator operation. Independent channels of repetitive signals are available to specify sync, servo and data patterns. For any given simulated head position, simulated adjacent tracks are chosen, and then mixed-in at an appropriate ratio. Signals that are unique to each track are also available to accommodate special requirements such as Grey code.

An advantage of the present invention is that an instrument is provided that can eliminate waiting for the HDA to be designed and fabricated, thus permitting the development and debug of associated boards prior to the availability of the drive mechanics. The result is faster time-to-market.

Another advantage of the present invention is that an instrument is provided that can be used to help develop servo patterns. Servo patterns can be quickly tested and changed. The patterns may be tuned and optimized for best performance of the demodulator without having a working HDA or a working servowriter. This can be an important asset to small firms with limited funds.

Another advantage of the present invention is that an instrument is provided that can result in better designs. It may be used to quantifiably generate worst-case signals to test and specify performance of the subsystems of the disk drive.

Another advantage of the present invention is that an instrument is provided that can be used in production testing. It can be programmed to generate both ideal and worst-case signals to accurately test servo electronic assemblies through their range of performance specifications.

Another advantage of the present invention is that an instrument is provided such that a systems analysis capability can be used to make Bode and Nyquist plots of external devices.

These and many other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENTS

Figure 1:
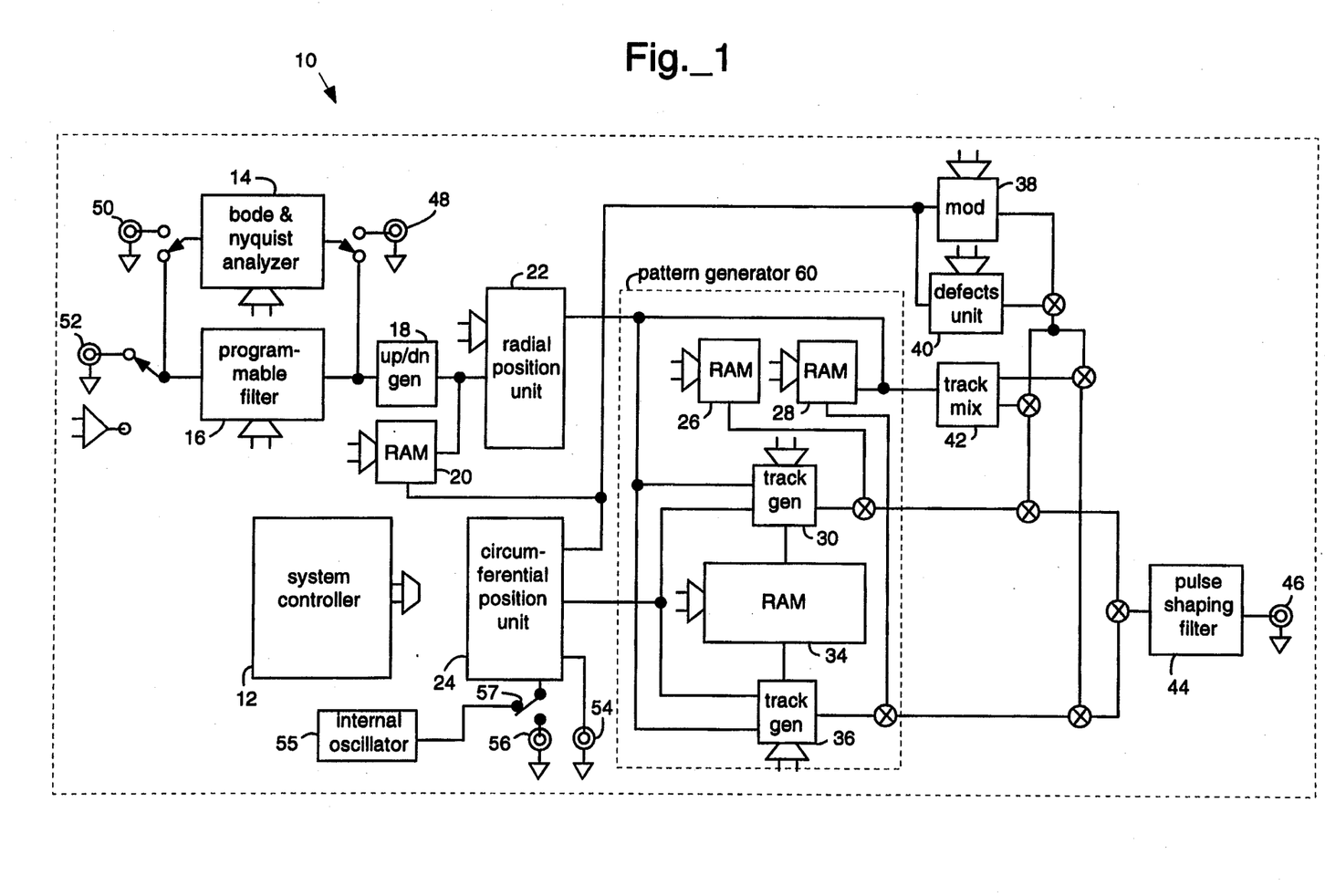
FIG. 1 is block diagram of a head disk assembly (HDA) simulator according to a first embodiment of the present invention.

A first embodiment of the present invention, an HDA simulator 10, mimics an HDA with a head that can seek tracks, and is shown in FIG. 1. HDA simulator 10 comprises a system controller 12, a Bode and Nyquist analysis unit 14, a programmable filter 16, an up/down generator 18, a runout random access memory (RAM) 20, a radial position unit 22, a circumferential position unit 24, an "n" Grey code RAM 26, an "n+1" Grey code RAM 28, an "n" track generator 30, an eight-track definitions RAM 34, an "n+1" track generator 36, a modulation unit 38, a defects unit 40, a track mix unit 42, a pulse shaping filter 44, a head signal output 46, an input 48, a source 50, an analog or digital positioner input 52, an index output 54, an internal clock oscillator 55, an external clock input 56 and a clock switch 57. The radial position unit 22 keeps track of the radial position of the simulated head. The position information is used to select one of eight available tracks for "n" track generator 30 and "n+1" track generator 36. The head position information is also used to generate a mix signal to control the proportions of track "n" to track "n+1" that the simulated head sees. The circumferential position unit 24 keeps track of the circumferential position of the simulated head, and is used to continuously control such items as patterns, modulation, defects and runout, which are all described in more detail below. A fixed frequency internal clock is used to control circumferential position unit 24, but the external clock 56 (e.g., 100 KHz to 48 MHz) may also be used to allow more flexibility, such as is needed to simulate actual spindle velocities. Programmable analog circuits in filter 16 simulate the HDA head positioner's characteristics for closed-loop operation. VCM inputs can be an analog voltage of 0–5, 0–10, or ±5 volts, with a 20K ohm single-ended input impedance. Eight-bit digital parallel inputs are also preferably accepted on a connector. The pulse shaping filter 44 changes representations of synthesized signals digital pulse into analog signals with shapes typical of magnetic disk recording techniques. The output 46 is a variable differential signal with a 200 millivolt maximum peak-to-peak level. PW50 is nominally 100 nanoseconds and is variable. A pattern generator 60 is formed by the combination of the "n" Grey code RAM 26, the "n+1" Grey code RAM 28, the "n" track generator 30, the eight-track definitions RAM 34 and the "n+1" track generator 36.

Figure 2:
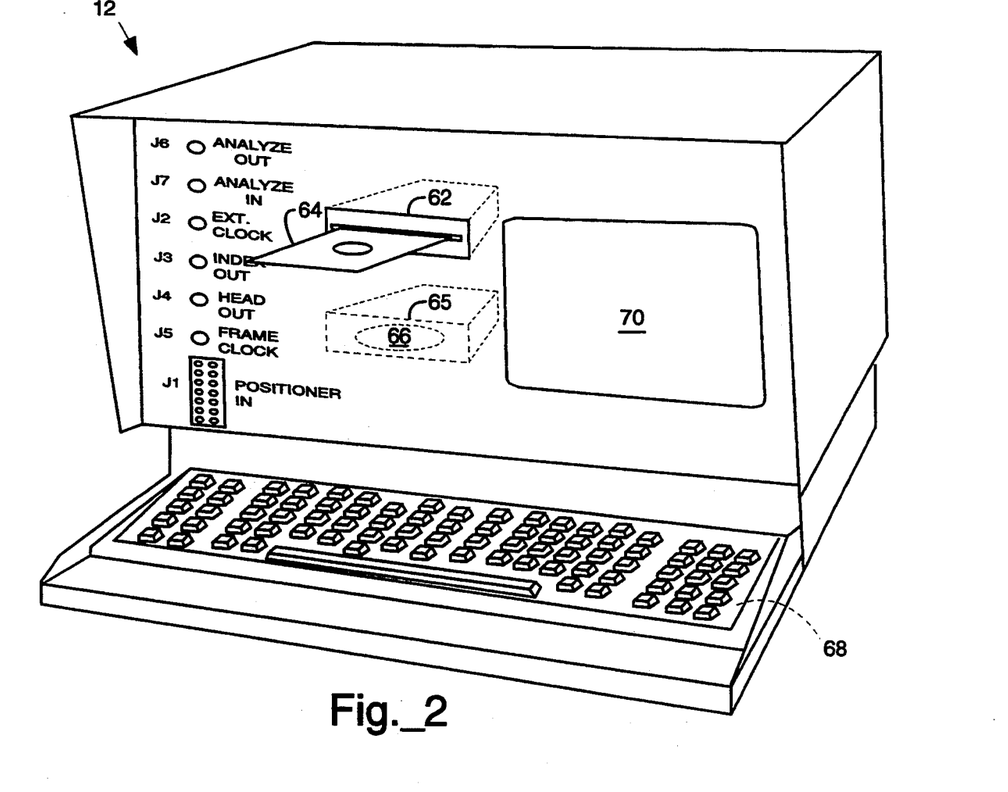
FIG. 2 is a perspective view of the connectors, display, and keyboard used in the simulator of FIG. 1.

Referring to FIG. 2, system controller 12 is preferably an IBM AT-type compatible personal computer (PC) with a disk operating system, a disk drive 62 that accepts a 1.2 megabyte floppy disk 64 and a twenty megabyte hard disk 65 with a plurality of disk files 66, a user keyboard 68, and a display 70 for the user to view. Disk files 66 may be transferred to and from floppy disk 64 between drives 62 and 65. Display 70 is preferably a EGA-type plasma display, and serial and parallel ports are preferably provided. Spare Industry Standard Architecture (ISA) bus slots are preferably made available for special applications. System controller 12 operates on DOS 3.3, or possibly other more recent versions as they become available, and a disk-resident text editor is provided for editing ASCII files 66 which control many of the operational parameters of HDA simulator 10. A comprehensive user interface is provided. Single level menus are displayed on display 70. Several different functionally organized menus provide complete control of all HDA simulator 10 operations.

Menus are selected by pressing one of the function keys of the left side of the keyboard. Such an interface is conventional. After the appropriate menu has been selected, single key menu entry selection provides actuation of the desired function. Servo-pattern type, content (including data field), positioner characteristics, and drive anomalies such as media defects and runout are fully programmable. A disk resident text editor is provided for convenient editing of ASCII files used by the HDA simulator 10. Commonly edited files include PATTERN, TRACK, DISK, and SETUP files.

In the form of files, the patterns can be edited by the user and supplemented by the supplier.

HDA simulator 10 uses either the internal clock oscillator 55, or the clock input 56 in the circumferential reference for generating servo-patterns. Radial positioning is generated by the system controller 12. HDA simulator 10 has the capability to generate embedded, dedicated or wedge type servo-patterns. The servo-patterns generated consist of frames or sub-frames, which are specified in a PATTERN.TYP file and stored in RAM. The basic servo frames are selected to make up the various servo track types, by a file labeled TRACK.TYP. After the required variations of track types have been established in the TRACK.TYP file (one of files 66), the DISK.TYP file is used to describe the servo pattern surface. System controller 12 examines the contents of the DISK.TYP file and then loads the appropriate TRACK.TYP track data into the eight track RAM 34, according to the theoretical position of the heads. The basic pattern elements (defined by the PATTERN.TYP file are preloaded into the pattern generator 60 (FIG. 1) during start-up and are called by the TRACK.TYP data as the track is being synthesized. The pattern generator provides the special circuitry required for generating the required servo-patterns in proper sequence, and outputs the patterns, synchronous with the positive transitions of the clock signal to the front panel head signal output 46. Since the entire setup pattern is dynamically defined by ASCII character strings, the content of the pattern is virtually limitless. Special encoding can be supported using mathematical expressions to define pattern content such as Grey codes. Track numbering and other disk parameters is determined by data in a SETUP file (one of files 66).

The pattern generator develops signals for two servo tracks. These tracks are referred to herein as "n" and "n+1". The signals from these two tracks are added in the proper ratio, as determined by simulated head position relative to the tracks. The mix and amplitude of these signals is influenced by such factors as modulation, runout, and defects, which are all selected from a perturbations menu.

Radial head position information is used to select one of eight available tracks for the "n" track generator 30, and one for the "n+1" track generator 36. Head position information is used to generate a signal that controls the mix of track "n" and "n+1" to mimic what an actual head would see in the position simulated. For example, when the head is directly over a track "n" only the signal from track "n" need be used. When the head is halfway between tracks "n" and "n+1", the mix should probably be equal amounts of "n" and "n+1" track signals.

The simulated circumferential position of the head on the disk is used continuously to control the response of HDA simulator 10. Simulation of the patterns, modulation, defects, and runout each require use of circumferential information. A clock is used to pace the circumferential position. An internal clock with several available rates is included. The external (TTL level) clock 56 can be used to allow more flexibility in the setting of the clock frequency, and can be frequency modulated (FM) to simulate instantaneous spindle velocity disturbances.

Pulse Filter

Filter 44 changes the digital pulse representation of the signal into a simulated analog readback signal. The output is a differential signal with a level of 200 mV p-p (adjustable). The pulse width known to those skilled in the art as "PW50" is normally set at 100 nanoseconds and can be varied as needed.

Five ASCII files 66, control HDA simulator 10. The PATTERN.TYP file stores a hex representation of frames used to construct simulated disk tracks. The TRACKNUM.TYP file stores a hex representation of frames that are unique to each track (including those reserved for Grey codes). The TRACK.TYP file specifies up to eight different tracks by building them up from frames that are stored in PATTERN.TYP and TRACKNUM.TYP files. DISK.TYP represents the surface of a disk as built up from tracks stored in TRACK.TYP. The SETUP.TYP file stores basic information about the HDA being simulated and the default values for a plurality of menu selections.

Frames are specified in the PATTERN.TYP and TRACKNUM.TYP files. Transitions are represented as hex numbers. Every frame is the same size, from one to sixteen bits. Up to 240 PATTERN.TYP frames are available for use in each track. Up to 2,048 TRACKNUM frames are available, with up to sixteen sectors in each track. The contents of the simulated tracks are contributed to TRACK.TYP file from frames of PATTERN.TYP and TRACKNUM.TYP. Up to eight tracks can be defined with 64,000 frames each.

The basic pattern elements, which are preferably stored in RAM, are program selectable and have eight variations. Four of the variations are the conventional sequencing of position and quadrature (P&Q) pulses. The first group has both a sync and a data pulse in addition to the P&Q pulses. It is referred to herein as a one (or mark) frame. The second group has an absent data pulse. It is referred to herein as a zero frame. The presence or absence of a data pulse is detected by a target drive module electronics, supplied by and probably being tested by the user. Unique combinations of zero and one frames allow the encoding of index, track types,. etc. The four basic type one frames are simply numbered one through four. The four basic type zero frames are simply numbered here as five through eight. Table I summarizes the encoding of these eight frames.

TABLE I

| Track Type Codes | |
| --- | --- |
| Standard Data Track Code | 11111 = 55555 66666 77777 or 88888 |
| Outer Guard Band Track Code | 00011 = 11155 22266 33377 or 44488 |
| Track Zero Code | 00110 |
| Inner Guard | 01100 = |

TABLE I-continued

| Track Type Codes | |
| --- | --- |
| Band Code | 15511 26622 37733 or 48844 |
| Index Code | 01010 = 15151 26262 37373 or 48484 |

Tracks

There are typically 5,000 frames per track: one five-frame index code sequence per track, and 4,995 other frames per track. These 4,995 frames are 999 repetitions of unique five-frame code sequences for the respective servo track type. Defining four sets (P&Q variation) of each of the track zone types (outer, zero, data, inner) requires fourteen track types. Referring to Table II, four outer guard band track frame types are tracks 1–4; data track frames are tracks 5–8. Inner guard band track frames are tracks 9–12; and two servo tracks required for track zero are tracks 20–21. The complete set of track definitions are stored in the TRACK.TYP file.

TABLE II

|  | Index | Track Type Code |
| --- | --- | --- |
| Track 1: | 15151 | 999*(11155) |
| Track 2: | 26262 | 999*(22266) |
| Track 3: | 37373 | 999*(33377) |
| Track 4: | 48484 | 999*(44488) |
| Track 5: | 15151 | 999*(55555) |
| Track 6: | 26262 | 999*(66666) |
| Track 7: | 37373 | 999*(77777) |
| Track 8: | 48484 | 999*(88888) |
| Track 9: | 15151 | 999*(15511) |
| Track 10: | 26262 | 999*(26622) |
| Track 11: | 37373 | 999*(37733) |
| Track 12: | 48484 | 999*(45544) |
| Track 20: | 37373 | 999*(33773) |
| Track 21: | 48484 | 999*(44554) |

PROGRAMMING PATTERNS

The disk surface is described by three general parameters: disk, track, and pattern. Each of the disk, track and pattern element (frame) parameters are defined in ASCII files 66. The DISK.TYP file is simply a sequential list of which track type is used when. Typically starting from the disk outside diameter to the disk inside diameter. Required pattern elements (patterns of ones and zeros) are read from PATTERN.TYP file and loaded into the pattern generator RAM 34. During HDA operation, system controller 12 uses DISK.TYP file to determine which track data (from TRACK.TYP file) to load into the pattern generator. The track data (from the TRACK.TYP file) is a sequential list of pattern elements, held in a shift register. The clock signal sequences through the track, which in turn calls all the appropriate pattern elements in proper sequence to generate the servo pattern.

Disk Parameters

The radial layout of the disk is defined (by track types) starting at the outermost track to be written, then working inward toward the spindle. Up to 2048 different track types can be defined.

Track Parameters

TRACK.TYP file defines the unique combination of available frame types that are used to make up different track types, such as outer guard band, track zero, etc.. Special sequences, such as index coding, are also included. Up to 240 different pattern types can be used to define a track type. Pattern elements can be from one up to sixteen clock cycles.

Pattern Element Parameters

PATTERN.TYP file contains basic pattern elements. A sequence of pattern elements is used to make up a servo track. These pattern elements are the lowest level of servo-pattern data, consisting of the actual pattern bit ones and zeros. Since most servo-patterns are made up of repeating subsections such as sync, preamble, track fill, etc., these can be defined as pattern elements and can be re-used. Unique track and/or sector numbering requirements are a special case, described below. Each pattern element is assigned a decimal number as an identifier, which is subsequently used in the track definitions contained in a TRACK.NP file (one of files 66). Every pattern element used in TRACK.TYP file must be previously defined in PATTERN.TYP file.

Dedicated Surface Servo-Writing

Available pattern types are used to make up the different elements which cover the dedicated servo surface(s), according to the design. Exactly the correct number/length of pattern elements are selected for one complete track with no overlap or shortfall.

Embedded Servo-Writing

Embedded servos require special considerations. Position bursts must be simulated one-half of a data track off from data track center. To accommodate this, every track is simulated twice. There are two special tracks for each embedded data track. For a given data track, the first simulation (one-half data track width) is with all normal on-track data such as sync preamble, track number, etc., followed by one of the position bursts. The second simulation is the same, one-half track further in, but contains the other position burst.

Track Numbers

Track numbers are handled as a special case and are held in file TRACKNUM.TYP file, which is a sequential list of all track numbers. For actual servo-writing, control of the write gate (WG) is required to prevent erasure of other data (such as marks, syncs, gaps, etc.) while the servo bursts are being inserted at their half track intervals. Control of the write gate is accommodated for in programming to achieve compatibility with the servowriter, but is not required for simulation.

DISK.TYP file specifies the usage of the different track types used to map out the entire written disk surface. Up to 240 different track types can be defined, in any order. An integer preceding the track type specifies a number of repetitions. Track types enclosed in brackets will sequentially alternate.

Example: DISK.TYP file 30*1 550*(1 2) 40*(3) describes a disk with an outer band of thirty type one tracks, 1100 alternating type one and type two tracks, and forty inner type three tracks. Track types are defined in the following sections.

Servo Track Definition

The disk surface is made up of user definable tracks. These are used to provide areas such as Guard Bands, track Zero, Data Area, etc. Up to 240 different track types can be used in the TRACK.TYP file. Strings of up to 64K pattern types are listed (in any order) after the track type, identified by a numeric digit. One or more lines of ASCII characters are used for each track type. A hyphen at the end of a line indicates that the description is continued on the following line.

Example: TRACKN: 1 232* (4 1) 300 *3

Each track "n" will be made up of sections consisting of one "type one" pattern element, one "type two" pattern element, 32 alternating "type four" then "type one" pattern elements, and 300 "type three" pattern elements. Track types must be defined for all unique areas of the disk, such as inner and outer guard bands, data area, etc. These tracks will be used by the DISK.TYP file.

Special Considerations

Number of pattern elements-Quantity of frames specified in each TRACK.TYP file must be precise. Too few frames result in the remainder of the track containing random frames. Too many pattern elements cause overwriting (overlap) of the beginning elements;

Content-System logic requires that the pattern element at the beginning of a track must start with a positive transition, a one. If a negative transition is required at the beginning of a track, a dummy element starting with a one must be inserted. The actual desired first frame is then added at the end of the track as one extra element, which will overwrite the dummy element; and Embedded Servo-Each data track is constructed from two special tracks. Each special track contains one or the other position bursts.

PATTERN ELEMENT DEFINITION

Tracks are made up of pattern elements. All pattern elements are the same length (defined in the SETUP.-TYP file, selectable from one to sixteen bits). This frame content is the lowest level element in the pattern. They define the individual ones and zeros that generate the pulses in the signal. The PATTERN.TYP file contains six columns of hexadecimal characters. Only the first column is used by HDA simulator 10. (The other five columns are used by the servowriter, and are kept in the file for compatibility). Each pattern element is identified by a decimal number. Those numbers are used in TRACK.TYP file to call the pattern elements.

Pattern elements may be any combination of ones and zeros, from one to sixteen clock pulses in length. Up to 240 types of pattern elements can be defined. When required, more complex pattern element types can be supported. Because of the inherent flexibility in the pattern elements, track, and disk content can also be defined by mathematical expressions. This supports Grey code embedding and other special considerations.

Regardless of their content, pattern elements are identified by a number from zero to 239. They may be combined in any sequence. A sequence of frames can be repeated by enclosing it in parenthesis following the repetition factor and an asterisk.

PATTERN.TYP File Format

All servo-pattern files 66, including PATTERN.TYP file, must start with a header line. This line is for user convenience only, and is not read by the program. The main program will ignore the first line in the file, thus the header are present as a place holder for the proper file read.

Channel 1,2,3 Pattern Data

There are three channels in the pattern generator of some commercially available servo-writers. This allows up to three surfaces to be simultaneously written with different data. HDA simulator 10 mimics only use of the first channel (column). The channel (CH1, etc.) columns provide the table of all required pattern elements for all servo tracks. The lines of data in the table can be in any vertical sequence, but the horizontal format of each line are exactly as stated herein. All pattern elements called for in the TRACK.TYP file are listed in this table, or an error will be reported. Unused (extra) pattern elements can be included.

The content of each pattern element contains four hexadecimal numbers which together represent sixteen bit positions. Each positive, zero-to-one transition will generate one pulse (not one di-pulse) of the opposite polarity of the previous pulse.

The pulse width can be controlled by having adjacent bit positions of the same value, such as. . . 0110 . . . (HEX 6) would provide twice the pulse width of. . . 0010 . . . (HEX 2). The same applies to spacing between pulses. The duration of each pulse is one clock cycle.

If, for example, the clock is ten MHz, each pattern element bit position is 100 nanoseconds long.

For programming convenience, the pattern element length can be set from one to sixteen bits, although all pattern elements are the same length. The length of the pattern element is defined in the SETUP.TXT file as frame length in clock cycles. For example, (all) pattern elements can be defined to be seven clock cycles long, in which case the least significant nine bit positions will be ignored. Each pulse position requires a positive edge from the clock, therefore there will be one (potential) pulse excursion per two clock cycles.

The following information is offered for servowriter compatibility concerns only, and does not necessarily limit the present invention.

Write Gate Control

There is a write gate control bit for each pattern element bit position. Therefore, a pattern element write gate HEX code of OOOO will turn the write gate on for all bit positions of that element, and FFFF will conversely turn it off for all bit positions. Turning the write gate off can prevent unwanted over writing of previous data. This feature can also be useful for establishing proper track end splice, by turning the write gate off at the required point to prevent overwriting the beginning of the track.

Verification Control

Like write gate control, above, each bit position can have verification enabled or disabled in the identical manner listed above. Turning verification off for "don't care" areas, such as fill between sector headers, or guard bands, improves throughput and reduces unnecessary drive rejection.

Head Selection

Head switching is required when different data are written to different surfaces of the same cylinder simultaneously, or to head switch at the end of a servo track for serial (rather than parallel) writing. When used, it will route the appropriate servo-data to the appropriate head. Each bit position, when set to (binary) one, will cause a head switch to the next sequential head. Random head addressing is not supported. Generally, it is best to define a unique pattern element for head switching only, with the write gate turned off. Head switching can then be done in the data area of the track, then being ready for the next header on the next track.

Track and Sector Numbering

Track and sector numbering is provided for embedded servos. It is handled as a variation of the pattern element technique, described above. The track and sector numbering mode are enabled by an entry in the SETUP.TXT file. Then the TRACKNUM.TYP file is searched for the first pattern element number in the required sequence which encodes the track or sector code. Subsequent pattern elements required to complete the code are sequentially stored (horizontally) in the TRACKNUM.TYP file. Any coding scheme can be supported, but the required codes are separately listed in the table. Like the DISK, TRACK, and PATTERN.TYP files 66, the TRACKNUM.TYP file is a structured ASCII text file (one of files 66). One may use a word processor (which does not embed control codes other than carriage return or line feed) or write a program to generate the (appropriately formatted) table. HDA simulator 10 can provide a sample program for generating track numbers.

TRACKNUM.TYP file pattern element entries can have supporting dummy (zero channel data) entries in the PATTERN.TYP file to provide write gate, verification, and head select control for each pattern element, included for servowriter compatibility. All pattern element positions can contain a number, although actual frame length is set in the SETUP.TXT file. Pattern elements are read from MSB (left) to LSB (right). When less than all sixteen bits (four HEX numbers) of a pattern element are actually used, the LSB can be binary zeroes. All embedded servo tracks are generated twice to accommodate burst offset and provide proper track width. The DISK.TYP and TRACK.TYP files can take this into consideration. Consideration is given to several areas for embedded servos. Each track is generated twice, to accommodate position bursts located one-half track offset from the data track center. The first can contain the track headers information plus one type of position burst. The second can again contain the same track headers information plus the other type of position burst. The next sequential generated track would contain new track header information for the next data track, but the position burst data would remain the same, since it is generating the second pass of that burst for the previous track. All embedded data is generated twice, but position data changes between data track centers, whereas headers change on track centers, and the data (non-header) area of the servo track may be filled with any data, or left unwritten. When the pattern is to be actually used for servowriting, due consideration are given to control of the Write Gate to prevent overwriting adjacent track bursts. Also it is preferable to turn verification off for data frames. Separate control of write gate and verification is provided for each pattern element used. These control fields may be available in the HDA for compatibility with commercially available servo-writers, but are not used during simulation.

HDA simulator 10 is operated by a user from computer 60 displaying readily accessible menus, which are functionally organized, and are selected using the function keys. Keyboard 68 is a conventional keyboard that includes these function keys. A key directory menu is available to the user, and is accessed by function key F9. The function keys are summarized in Table III.

TABLE III

| F1 | Fundamental Positioning | Allows a wide range of control of the simulated head position to read the servo pattern. Position can be selected by track number, or repositioned from its current location by a specified increment. Also provides access to seek operations and characteristics. |
|---|---|---|
| F2 | Perturbations | Allows input of multiple drive anomalies such as |

TABLE III-continued

| | | |
|---|---|---|
| | | modulation (overall media variation), defects (scratches across all tracks), and spindle runout. A master gain control is also preferably included. |
| F3 | Closed Loop Positioning | Provides access to Bode and Nyquist plotting functions, which can be used internally or externally. Resonances can be specified for simulations. A three pole programmable filter (see FIG. 5) is also preferably included to emulate HDA positioner performance. Plots of head trajectory are also provided in this menu. |
| F4 | Low Level Control | Gives access and control to utilities and special functions: editing configuration files 66, diagnostics, re-loading files 66 and HDA simulator 10 re-initialization, low level port and memory access commands |
| F5-F9 | not assigned | |
| F9 | Key Directory | Provide a convenient listing of menu and Special function selection keys. |
| F10 | Exit to DOS | |

Note:
low level port and memory access commands are displayed only in debug mode.

Clock Source

The default clock source is the internal clock. There will be a prompt at the lower left corner of display 70 indicating the clock frequency. To use an external clock source, a TTL clock source is connected to the clock input 56. A clock source entry in the SETUP.TXT file is edited via the F4 menu to enable the external input. Different internal clock frequencies may be obtained by changing the clock divider value in the SETUP.TXT file. The internal crystal may be exchanged for a different (albeit fixed) frequency.

Computer Reset

By simultaneously pressing the CTRL, ALT, and DEL keys on keyboard 68 momentarily, and then releasing them, computer 60 will reset and the main control program will be re-loaded.

Re-Initialize Simulator

From keyboard 68, pressing function key F4, and then selecting Re-initialize Simulator, will cause all HDA simulator 10 circuitry to be reset and files 66 to be reloaded.

Exiting to DOS

From any menu, by pressing F10, then answering Y (yes), the user can then rerun the HDA simulator program by entering MAIN at the DOS prompt. To temporarily exit the HDA simulator 10 main program, but still leave it in memory (to save re-load time), ALT-Z is typed to shell to DOS. EXIT is typed in to return to the main program.

Clearing Error Conditions

When HDA simulator 10 encounters an abnormal condition, an error is reported on display 70. Subsequent operation is halted until the error is cleared by pressing the escape (ESC) key on keyboard 68. In instances where further operation is impossible or hazardous, the error condition will continue to be displayed and operation halted until the condition causing the error is corrected.

User Interface

The user interface is menu driven. Most entries only require a single key input of the menu selection. Pressing [RETURN] or [ENTER] is not required for these menu selections. When additional information is needed by the HDA simulator to execute the user's command, a prompt will appear at the bottom of display 70. In many instances, a default value is presented. It may be accepted by pressing [ENTER], or cleared by the backspace key. When cleared, the new value is entered and [ENTER] is pressed. Menu displays F1 through F4 access track number and microstep position of the head, at the top of display 70.

Fundamental Positioning-F1

Tracks can be selected by special or user track number. For embedded servos, all user tracks consist of two special (half) tracks, in order to accommodate half track offsets for positioning bursts, while keeping other header information on user (data) track centers. This can also be considered when programming embedded servo patterns. Default micro-steps are sized to be 1/512 the distance between adjacent simulation tracks. Larger values can also be selected (e.g., 256=one-half, etc.). In all cases, head position implies generating the signal that would exist if the drive head were moved to that physical position. Table IV summarizes the above.

TABLE IV

| | | |
|---|---|---|
| A | Step In - Special Track(s) | Each press of this key will change the head position by the number of tracks specified. Number can be specified with the L command, below. Signal will represent head positioned directly over a servo track. |
| B | Step In — User track(s) | Each press of this key will change the head position by the number of tracks specified. Number can be specified with the L command, below. Signal will represent head positioned directly over a data track center. |
| C | Change Micro-Step | Pressing the C key causes the HDA simulator to request a new value, in micro-steps, to move when the + or − key is pressed in this menu. The default value is specified in the SETUP file (one of files 66), and is typically 1/512 special track space value. Range one to 512. |
| D | Seek to First Special Track | Head will be positioned at the first HDA simulator 10 × track; as specified in the DISK.TYP file (one of files 66). |
| E | Seek to Special Track "n" | When selected, HDA simulator 10 will ask for a track number for "n", and then move the head to that position. |
| F | Seek to Last Special track | Head will be positioned at the last servo track, as specified in the DISK.TYP file (one of files 66). |
| G | Bounce Between Tracks | Moves the head continuously between two user track numbers, which are prompted for. Press the ESC key to abort the operation. Movements are controlled by velocity and acceleration values. |

TABLE IV-continued

| | | |
|---|---|---|
| H | Set Velocity | Specifies the rate of change for head movement in tracks per milliseconds. Range zero to $10^{38}$. |
| J | Step Out - Special Track(s) | Each press of this key will change the head position by the number of tracks specified. Number can be specified with the L command, below. |
| K | Step Out n# User Track(s) | Each press of this key will change the head position by the number of tracks specified. Number can be specified with the L command, below. |
| L | Change Step | Changes the number of tracks moved when the A, B, J, or K command is issued, in integer values. Specified in special tracks. When embedded servo is used, user track step increment will be two times this value. |
| M | Seek to First User Track | Head will be positioned at the first user data track; as specified in the DISK.TYP file (one of files 66). |
| N | Seek to User Track | When selected, the HDA simulator will ask for a track number for "n", and then move the head to that data track position. |
| O | Seek to Last User Track | Head will be positioned at the last user track, as specified in the DISK.TYP file. |
| P | Execute Seek File | Causes seeks to special track numbers contained in the SEEK.TXT file (one of files 66). The SEEK.TXT file may be altered using the Editor available in the F4 menu. Select O (Other) for file to edit, then enter SEEK.TXT for the file name. |
| Q | Set Acceleration | Specifies the acceleration/deceleration rate to be used during head moves, in tracks per milliseconds squared. Range zero to ten. |
| + | Move In | Pressing the + key causes the head signal to change as if the pattern head moved in toward the spindle by a specified amount, in microsteps. The amount is specified by the "C" menu selection, listed above. |
| − | Move Out | Pressing the key causes the head signal to change as If the pattern head moved out from the swindle by a specified amount, in microsteps. The amount is specified by the "C" menu selection, listed above. |

Perturbation Menu-F2

Three general types of perturbations are possible: modulation, media defects, and spindle runout. All three types amplitude modulate the synthesized head signal:

MODULATION causes a sinusoidal modulation typical of media coating variations;

DEFECTS cause a once-per-revolution drop in amplitude, programmable in width, position and amplitude. Only scratches across all tracks are selectable, although a special track type could be used to drop out specific pulses on specific tracks; and SPINDLE RUNOUT differentially modulates only the position pulses, to emulate tracks moving side-to-side under the head.

Reload commands are used to cause specified perturbations to take affect. Settings are canceled (zeroed) by selecting the menu item, entering zero for the amplitude and then pressing [RETURN].

TABLE V

| | | |
|---|---|---|
| A | Modulation One | Selects a sinusoidal amplitude modulation which can be specified in percent of total amplitude and how many (integer) cycles per revolution. R - Reload Gain and Mods causes modulations to be implemented. Select the modulation, enter zero for the amplitude and press [RETURN] to cancel, then reload. |
| B-E | Modulation ("n") | See A., above. These values are summed with all other perturbations. |
| F | Runout One | Selects a differential sinusoidal amplitude modulation which is applied to position pulses only. specified in percent of total amplitude and how many cycles per revolution. R - Reload Runout to cause perturbations to be implemented. Select the runout, enter zero for the amplitude and press [RETURN] to cancel, then reload. |
| G-I | Modulation ("n") | See A, above. These values are summed with all other perturbations. |
| L | Defect One | Selects an amplitude modulation which can be specified in percent of total amplitude, location in respect to Index and length in frames (pattern elements). Use the S - Reload defects to cause modulations to be implemented. Select the modulation, enter zero for the amplitude and press [RETURN] to cancel then reload. |
| M-P | Defect ("n") | See L, above. These values are summed with all other perturbations. |
| Q | Gain | Selects overall gain. Default value is 100%. Specified in percent of full output. R - Reload gain and mods to cause gain setting to be implemented. Select gain, enter 100 for the amplitude and press [RETURN] to return to full output, then reload. |
| R | Reload Gain, Mods and Defects | Causes system controller 12 to read new gain, modulation and media Defect values and apply their summed values to the head output signal. |
| S | Reload Runout | Causes system controller 12 to read new runout |

TABLE V-continued

| | |
|---|---|
| | values and apply their summed values to the head output signal. |

Closed Loop Positioning-F3

This menu is used for four general applications:

to provide a stand-alone analyzer which will generate Bode plots and Nyquist diagrams of external equipment, such as a real HDA;

to plot Bode an Nyquist diagrams showing the response of the internal filter which simulates an HDA, either actual or under design;

to provide a closed loop, setting the programmable filter to HDA response characteristics; and to plot the simulated trajectory of the head in closed loop mode.

Filter Plot Mode

Filter parameters are set to emulate the positioner performance for the target HDA. Where possible, the plotted results are compared with a plot from a similar HDA to verify filter settings.

External Loop Mode

Filter parameters are set to emulate the target HDA. Where possible, the plotted results are compared with a plot from a similar HDA to verify filter settings. The differential head signal is fed from HDA simulator 10 by a TWINAX BNC connector to the (external) drive electronics. The drive electronics positioner signal is fed into HDA simulator 10. Either an (eight-bit) TTL digital signal is input, or an analog differential signal is input.

Analyzer Mode

Bode and Nyquist plotting functions can be used on external circuitry. None of the filtering, positioning or perturbation settings affect the analysis operation. See items I–L, below, for controls and operations. Output amplitude is preferably automatically scaled to generate the required input signal.

A-Resonance One

One of two available resonant points is set in the HDA simulation filter and is specified by frequency and amplitude. (The hardware is discussed in more detail below in connection with FIG. 5.)

TABLE VI

| Term | Units | Range |
|---|---|---|
| Frequency | Hz | 5Hz–3KHz |
| Amplitude | None | 0–100 |

Values are cleared by selecting the menu item, entering zero for amplitude, then [RETURN].

B-Resonance Two

See item A, above

C-Pole One

One of three available poles is determined for the HDA simulation filter. (Pole zero is fixed, at zero Hz). It is specified by frequency. The input range is typically five Hz to three KHz. Values are cleared by selecting the menu item, entering zero for the amplitude, then pressing [RETURN]. (The hardware is discussed below in connection with FIG. 5.)

D-Pole Two

See item C, above. (The hardware is discussed below in connection with FIG. 5.)

E-Zero

Determines a zero point for the HDA simulation filter. It is specified by frequency. The input range 0–5K Hz. Values are cleared by selecting the menu item, entering zero, then pressing [RETURN]. (The hardware is discussed below in connection with FIG. 5.)

F-Filter Gain

Sets gain of HDA simulation filter. Range zero to 100. (The hardware is discussed below in connection with FIG. 5.)

I-Signal Source

Toggles the input signal source (internal to HDA simulator 10, or external) for plotting functions. Internal is default. (The hardware is discussed below in connection with FIG. 5.)

J-Frequency Range

Selects the range of frequencies used as stimuli when generating plots. Range one Hz to 3000 Hz. Select a lower and upper value. Analyzer automatically steps through a range of points within that range. Eliminating frequencies below ten Hz significantly speeds plot time.

K-Generate Bode Plot

Causes the analyzer to generate two automatically scaled plots, one amplitude vs. frequency, the other (lagging) phase vs. frequency. Data from this plot is also saved in a file BODE.OUT.

L-Nyquist Diagram Half-Size

Sets vertical and horizontal scale factors for Nyquist diagrams. This value may be re-selected followed by the generate Nyquist command below, to re-plot the same data at the new scale. Range 0.1 to 10K.

M-Generate Nyquist Diagram

Causes analyzer to generate an automatically scaled Nyquist diagram. This function may take minutes depending on number of points selected. See also I and J, above, "n" below Data from this plot is also saved in a file (one of files 66): Nyquist.OUT.

N-Number of Plot Points

Specifies number of samplers to be taken in the frequency range specified above. Interpolation occurs between points. Time to generate a plot increases as number of points increase. Range three to 200 (integer).

T-Capture Trajectory

When an external position input is fed to front panel J1, this command captures several revolutions of head movement information, relative to time. Vertical (movement) is auto-scaled in tracks.

U-Plot Trajectory

See T, above. This command causes the head trajectory information captured to be plotted. While the plot is displayed, press F1 to display a list of output options. Data from this plot is also saved in a file (one of files 66): TRAJ.OUT

LOW LEVEL CONTROL-F4

A-Read Memory Block

This menu item is only displayed when debug mode (ALT+D) is active. This function allows inspection of special memory segments used by HDA simulator 10 for various functions. When selected, HDA simulator 10 will request a memory segment (type):

P Pattern Memory;
F Frame Memory;
S Sync Delay (di-pulse Width);
I Position Delay (di-pulse Width);
R RAM (When optional Frame RAM is installed); and
O Other.

After the memory has been selected, HDA simulator 10 presents the segment location and the default starting address. This address can be accepted by pressing [EN- TER]; or edited by backspacing and entering the desired address, followed by [ENTER]. Next, HDA simulator 10 will specify the ending address, which can be accepted or modified as above. After [ENTER] is pressed, a hex display 70 dump will begin, one display 70 at a time. The dump can be paged down with the space bar and terminated with the escape (ESC) key.

D-Reload DISK.TYP File

The DISK.TYP file will be reloaded from disk into memory and any edits to it will now affect operation of the HDA.

E-Edit File

This command will allow the user to edit ASCII files 66 with a text editor. ASCII File types available for editing are:

S Setup-General programmable operational parameters;

P Pattern-Definition of servo pattern types;

T Track-Definition of servo track types;

N Track Numbers-Table of track numbers (typically Grey codes)

D Disk-Definition of the servo disk(s); and

O Other-HDA simulator 10 will request a filename.

F-Fill Memory

This menu item is only displayed when debug mode (ALT+D) is active. This command will allow the user to fill a contiguous range of memory locations with one hex value. This function allows alteration of special memory segments used by the HDA simulator for various functions. When selected, the HDA simulator will request a memory segment (type):

P-pattern memory

F-frame memory

S-Sync delay (di-pulse width) -position delay (di-pulse width)

R-RAM (When optional frame RAM is installed)

O-Other.

After the memory has been selected, HDA simulator 10 presents the segment location and the default address. This address can be accepted by pressing [ENTER]; or edited by backspacing and entering the desired address, followed by [ENTER]. Changing this type of memory location affects subsequent HDA simulator 10 operation immediately, but is not saved to disk.

I-Input Port

This menu item is only displayed when debug mode (ALT+D) is active. This function allows the user to read registers. HDA simulator 10 will request the port address and after [ENTER] is pressed, will return the hex contents of that location.

O-Output Port

This menu item is only displayed when debug mode (ALT+D) is active. This function allows the user to write registers. The HDA simulator will request the port address and after [ENTER] is pressed, will change the hex contents of that location.

P-Reload PATTERN.TYP file

The PATTERN.TYP file will be reloaded from HDA simulator disk into memory and any edits to it will now affect operation of the HDA.

R-Read Memory

This menu item is only displayed when debug mode (ALT+D) is active. This command allows the user to read a single memory location. This function allows inspection of special memory segments used by the HDA simulator for various functions. When selected, the HDA simulator will request a memory segment (type):

P-pattern memory

F-Frame Memory

S-sync delay (di-pulse width) -position delay (di-pulse width)

R-RAM (When optional frame RAM is installed)

O-Other

After the memory has been selected, HDA simulator 10 presents the segment location and the default address. This address can be accepted by pressing [ENTER]; or edited by backspacing and entering the desired address, followed by [ENTER].

S-Reload the SETUP.TXT File

The SETUP.TXT file will be reloaded from HDA simulator 10 disk into memory and any edits to it will now affect operation of the HDA.

T-Reload TRACK.TYP File

The TRACK.TYP file will be reloaded from HDA simulator 10 disk into memory and any edits to it will now affect operation of the HDA.

W-Write Memory

This menu item is only displayed when debug mode (ALT+D) is active. This command allows the user to write a single memory location. This function allows alteration of special memory segments used by HDA simulator 10 for various functions. When selected, HDA simulator 10 will request a memory segment (type):

P-pattern memory

F-frame memory

S-sync delay (di-pulse width) -position delay (di-pulse width)

R-RAM (When optional frame RAM is installed)

O-other

After the memory has been selected, HDA simulator 10 presents the segment location and the default address. This address can be accepted by pressing [ENTER], or by edited by backspacing and entering the desired address, followed by [ENTER]. Changing this type of memory location affects subsequent HDA simulator 10 operation immediately, but is not saved to disk.

X-Run Diagnostics

This command causes diagnostics to be run. If an error condition is detected, an error code is shown on display 70. The error code will remain until the escape (ESC) key is pressed. The diagnostic will halt at the error and will not proceed until the first error is cleared, since that error may cause other apparent errors which are a result of the first error. Press [ESC] to abort the diagnostic. F5 is pressed to clear the message from the display 70.

Z-SAVE SETUP Parameters

Execution of this command will cause variables used in the other menus to be saved and used as default values for later use.

Special Function Keys

Special functions can preferably be accessed from any menu by holding down the ALT key and pressing the appropriate alphabetical key. When the selected function is enabled, an indicator will appear at the lower right corner of display 70 in reverse video. These are summarized in the following table. In the table, "toggle" means that each time the key is depressed, the controlled function will change state from enabled to disabled, or disabled to enabled.

TABLE VII

| ALT C | Set-Reset Continuous | Activating this function causes certain functions to |

TABLE VII-continued

| | | |
|---|---|---|
| | Flag | repeat on a continuing basis, within certain timing and logic condition intervals. Pressing the escape (ESC) key will terminate the particular continuing function. This is a toggle activate/deactivate function. When set ON, selecting it again will turn the function OFF. A C status message is presented at the bottom line of the current menu when this function is active. |
| ALT D | Set-Reset Debug Flag | Activating this function causes additional information to be presented on-display 70 when certain functions are active. It can be useful in setup and problem solving. When operating in debug mode, some operations may halt after display of results. Pressing [ESC] continues operations. This is a toggle activate/deactivate function. When set ON, selecting it again will turn the function OFF. A D status message is presented at the bottom line of the current menu when this function is active. |
| ALT L | Select Positioner Input | This function selects either the analog (default) or digital positioner input at J1 on the front panel. Pressing these keys also causes the current mode to be displayed. |
| ALT R | Activate-Terminate Record Sequence | This mode provides user programming for a sequence of operations. A special test sequence can be recorded and then executed once or repetitively until interrupted. When this mode is activated, every subsequent keyboard 68 entry is stored, including menu function (F1, etc.) keys. Variables such as track numbers, etc. (prompted for at the lower center of the display 70) can not be included in the recorded sequence. When the desired sequence has been entered, press ALT R a second time to terminate recording. At this time the user will be prompted for a (DOS) file name into which the user's key sequence will be stored. |
| ALT S | Start-Stop Sequence | This command allows execution of a recorded sequence of key presses which were stored using the ALT R command, above. HDA simulator 10 will prompt the user for the (DOS) filename containing the stored sequence. The user can know the filename prior to activating this function. If needed, use the F10 key to exit to DOS, then use the DOS Dir command to retrieve the filename. If the user used the ".SEQ" extension, entering *.SEQ will display the list of the user's sequence files 66. After the file has been retrieved it will continue to execute until ALT S is again input. If commands were stored which require a variable to be entered (such as track Number, the programmed sequence will halt until the variable is keyed in, followed by pressing [ENTER]. Then the sequence will resume. See ALT R for additional information. |
| ALT T | Set-Reset Test Flag | This function disables protective features to allow fuller control of functions, particularly for HDA simulator 10 testing and troubleshooting. This is a toggle activate/deactivate function. When set ON, selecting it again will turn the function OFF. A 'T status message is presented at the bottom line of the current menu when this function is active. Reboot after using this feature. |
| ALT X | Exit to DOS | Terminates HDA simulator 10 program and exits to MS-DOS. |
| ALT Z | Shell Exit to DOS | Terminates HDA simulator 10 program, but leaves it in memory. Exits via DOS Shell to MS-DOS. To return to HDA simulator 10 program, type EXIT [RETURN]. |

PROGRAMMING OPERATIONAL PARAMETERS

These parameters are used to establish application-unique factors which can be modified to meet specific requirements. The text editor can be used to edit one of files 66, including the servo-pattern description files DISK.TYP file, TRACK.TYP file and PATTERN.TYP file, described herein.

Parameter File

An ASCII file called SETUP.TYP file is used to hold these parameters. It is easily edited using the text editor provided in the low level control menu accessed by the F4 function key. Parameters controlled by this file include:

track numbering;
clock data;
head trajectory data;
default perturbation values; and
default closed loop operations values.

A feature in the F4 menu, SAVE SETUP, saves variables entered in other menus to the SETUP.TXT file as default values.

A text editor is provided with HDA simulator 10 on hard disk 65. The editor is accessed under the low level control engineering mode menu F4.

OPERATIONAL PARAMETERS

These operational parameters are listed in Table VIII in the sequence they are positioned in the SETUP.TXT file. Some items may not be listed in the user's SETUP file if they are not applicable to the user's configuration.

TABLE VIII

| | |
|---|---|
| Initial Microstep | Sets the default value in n, where one microstep is defined as one $512^{th}$ of a |

TABLE VIII-continued

| | |
|---|---|
| Increment | full special track change. Integer. Example: entering 256 would make each microstep one-half(256/512) of a special track. Range 1-512 (integer). |
| Initial HDA Simulator 10 Step Increment | Sets the default nurber of special tracks moved when a Step IN/OUT n special tracks command is issued. Range 1-20,000 (integer). |
| Number of Special Tracks Per Client Track | Sets ratio of special tracks to client tracks. Normally set to 1 for dedicated surface; 2 for embedded, to support half track offsets for position bursts. Range 1-8 (integer). |
| Number of Special Tracks Before First (User) Data Track | Provides an offset for special applications. Range 0-1K (integer). |
| HDA Simulator 10 First Track Number | Sets starting special track number. Range −99 to +99. |
| Client First Track Number | Sets track numbering display method for Client Tracks. Range −99 to +99. Does not affect Grey code values. |
| Clocks per Frame | Each pattern element location in memory is sixteen bits. For some patterns it is more convenient to use less than all 16 locations. This parameter defines how many of the sixteen bits are used, starting at the left-most (MSB) bit. Range 1-16. |
| Clock Frequency | Informs the HDA simulator 10 program of the frequency of the Internal Clock crystal. This Crystal can be changed to a different value than that originally installed, to obtain special clock frequencies. See Clock Divider, below. Theoretical range 1-80 MHz. |
| Clock Divider | Specifies a divider value for the internal clock frequency (above). Range two through 255, integer. Does not affect external clock input. |
| Track Numbers Required | When set to T (True), instructs the program to use the contents of the TRACKNUM.TYP file for track numbering. Typically for embedded servos. |
| Head Movement Velocity | Sets the open loop seek rate, in special tracks per millisecond. Range 1-1038. |
| Head Movement Accel. | Sets the open loop acceleration and deceleration rates emulated during seeks in Tracks per milliseconds squared. Range 1-10$^{38}$. |
| Number of Mod. Perturb. | Sets maximum number allowed, up to five. |
| Number of Modulation Cycles per Rev. | Sets default values for up to five selections. |
| Modulation Amount | Sets default amplitude values in percent of total amplitude. Up to five selections. Range 0-100%. |
| Gain Amount | Sets default value for overall gain setting, in percent of maximum. Range 0-100%. |
| Number of Defects | Sets default number of defects, maximum five. |
| Defect Frame Location | Sets default values for defect locations referenced to index, in frames (pattern elements). Range 1K-64K (integer). |
| Defect Span | Sets default values for lengths of defects, in frames (pattern elements). Range 1K-64K (integer). |
| Defect Amplitude | Sets default values for up to five defects amplitudes, in percent of maximum. Range 0-100%. |
| Runout Freqs. | Sets the allowable number of runouts, up to five. |
| Runout Cycles per Rev. | Sets default values for up to five runouts, in cycles per revolution |
| Runout Amount | Sets default values for up to five runout amplitudes in percent of maximum. Range 0-100%. |
| Digital Filter Input Source | Sets the default source for the filter. T = Digital input, 8 bit. F = Analog input, −5 to +5 volts. |
| First, Second Resonance Enabled | Sets whether resonances will be displayed as menu items T YES, F = NO |
| First, Second Pole Enabled | Sets whether filter pole menu items will be displayed. T = YES, F = NO |
| Zero Enabled | Sets whether the zero filter function menu selection will be displayed. T = YES, F = NO |
| First, Second Resonance Amplitude | Sets default values for resonance amplitudes. Range zero to 100. |
| First, Second Resonance Frequency | Sets default values for resonance frequencies. Range 5Hz to 3K Hz. |
| First Pole Frequency | Sets default values for pole frequency. Range 1 Hz to 256 Hz. |
| Second Pole Frequency | Sets default values for pole frequency. Range 5Hz to 3K Hz. |
| Zero Frequency | Sets the default value for the filter Zero frequency. Range 5 Hz to 3K Hz. |
| Filter Gain | Sets the default gain value for the filter. Range zero to 100. |
| Closed Loop Runout Cycles Per Rev. | Sets the default value for closed loop runout, in cycles per revolution range 1K-32K (integer). |
| Closed Loop Runout Amplitude | Sets the default value for closed loop amplitude. Range zero to 100. Units not defined. |

Figure 3:
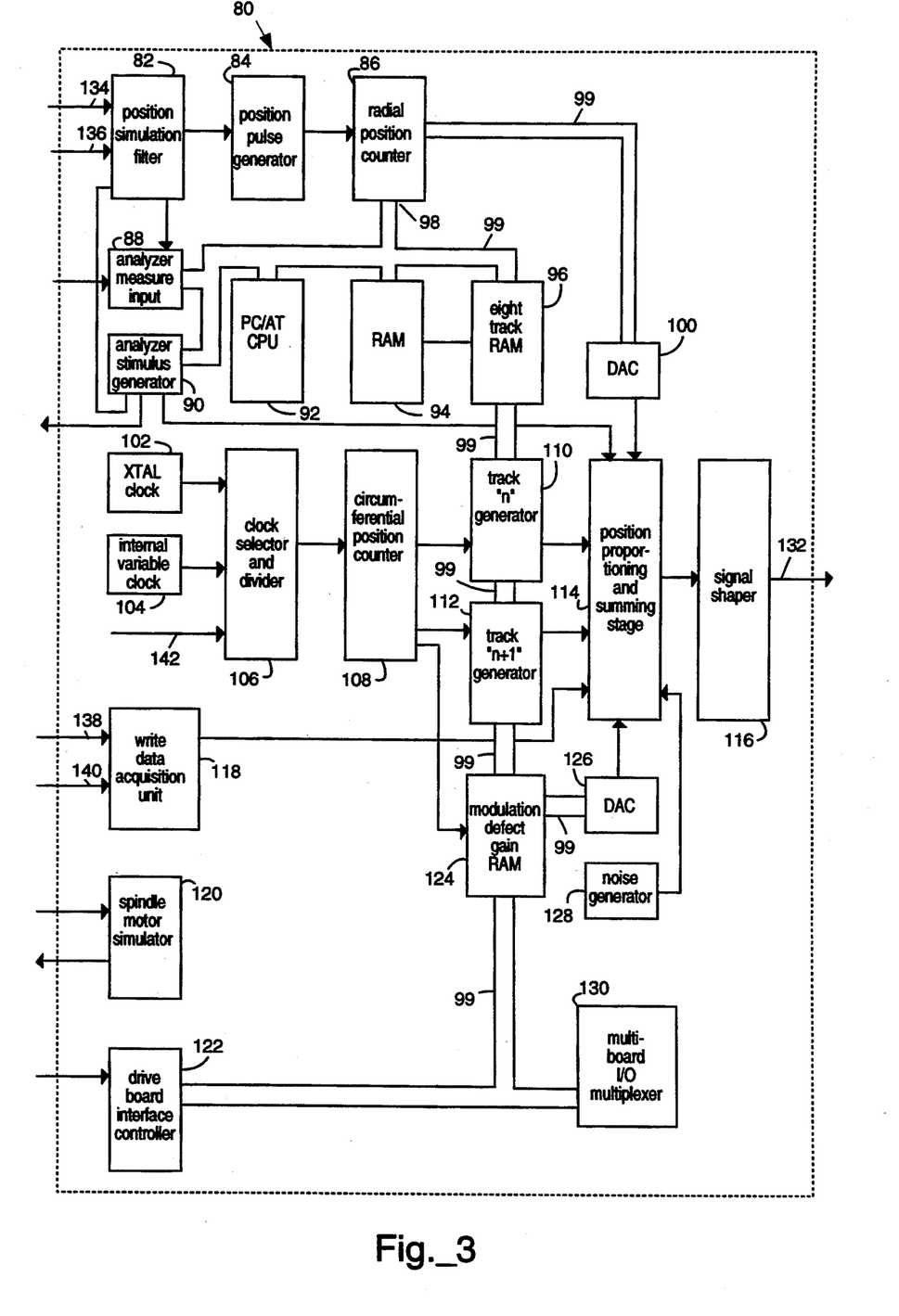
FIG. 3 is a block diagram of a head disk assembly (HDA) simulator according to a second embodiment of the present invention.

FIG. 3 illustrates a second embodiment of the present invention which is an HDA simulator 80 comprising a positioner simulation filter 82, a position pulse generator 84, a radial position counter 86, an analyzer measurement input 88, an analyzer stimulus generator 90, a microcomputer (PC/AT CPU) 92, a pattern element RAM 94, an eight track RAM 96, an open loop input 98, an interconnect bus 99, a digital-to-analog converter (DAC) 100, an internal crystal (XTAL) clock 102, an internal variable clock 104, a clock select and divider 106, a circumferential position counter 108, a track "n" generator 1107 a track "n+1" generator 112, a position proportioning and summing stage 114, a signal shaper 116, a write data acquisition unit 118, a spindle motor simulator 120, a drive board interface controller 122, a modulation-defect-gain RAM 124, a DAC 126, a noise generator 128, a multi-board I/O multiplexer 130, a head output signal 132, a drive position input signal 134, a digital input signal 136, a data input 138, a write gate input 140 and an external clock input signal 142. HDA simulator 80 is similar in function and purpose to HDA simulator 10 and the above described menus, files 66, patterns and programming are also applicable to HDA simulator 80, so their description will not be repeated here.

Figure 4:
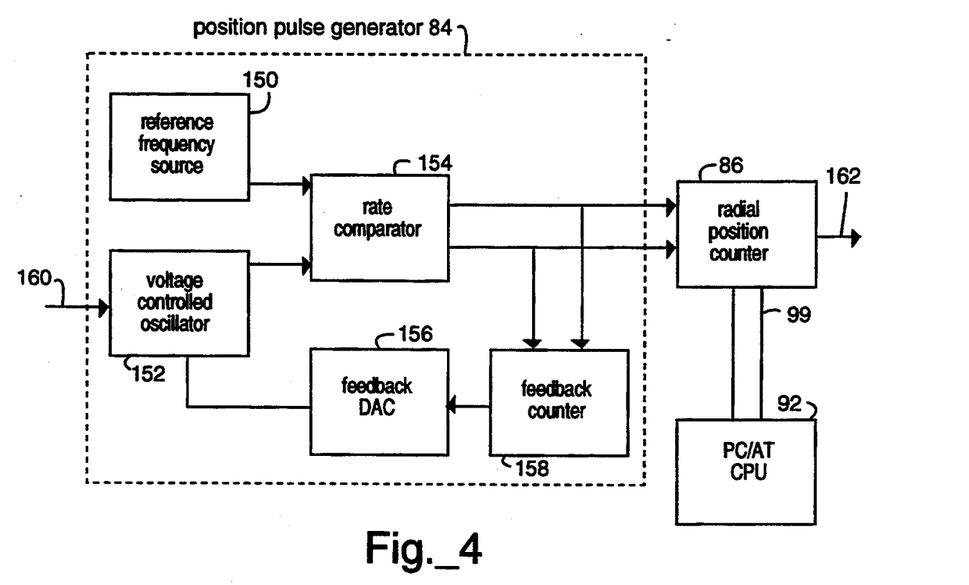
FIG. 4 is a block diagram of the position pulse generator used in the simulator of FIG. 3.

In FIG. 4, position pulse generator 84 comprises a reference frequency source 150, a position pulse voltage controlled oscillator (VCO) 152, a rate comparator 154 that produces up and down pulse outputs, a feedback DAC 156, and a feedback counter 158 to net the up and down pulse outputs. CPU 92 controls radial position counter 86 over bus 99 for the signal to the position proportional summing stage 114 based on the action of position pulse generator 84.

To simulate disk read/write, HDA simulator 80 generates a clock to synchronize circumferential movement and uses position counter 86 to track radial (in/out) head movement. HDA simulator 80 will operate either closed loop with drive board 122 receiving an input or open loop with a synthesized radial position.

For an open loop operation mode, radial position counter 86 is controlled directly by PC/AT CPU 92 (which is equivalent to system controller 12 in the first embodiment). Micro-track positions are loaded in accordance with an open loop positioning menu. The output of radial position counter 86 is used to determine the appropriate track types to load from eight-track RAM 96 into track generators 110 and 112 and the proportions of "n" and "n+1" to be summed for a simulation of the head position (e.g., on/off track). Circumferential tracking is derived through clock selector and divider 106 from one of three possible clocks: external clock 142, internal high precision clock 102 or internal variable clock 104. Varying the clock rate allows simulation of an HDA spin-up/spin-down and spindle speed variations. The selected clock is divided according to the desired rate and the length of each pattern element used to build up the tracks. The chosen signal clocks the track data (that has been pre-loaded into the track generator 110 and 112) to the position-proportional summing stage 114. Quantified track-to-track phase incoherence can be mimicked. This is done by delaying the output of one track, "n" or "n+1", with respect to the other. The position-proportional summing stage 114 selects the amplitudes for the track "n" and track "n+1" data to be proportionally related to the radial position counter/runout input from DAC 100. Signals "n" and "n+1" are then summed. The amplitudes are also influenced by perturbation generator signal input from DAC 126. The perturbation generation supports modulation, media defect and overall gain artifact selections from a perturbation menu accessible by the user. PC/AT CPU 92 (under program control, of course) loads a shift register similar to the track generators 110 and 112 with a summation of the three types of perturbations. The shift register is clocked by the track data and so the summation will be in sync with the track data. The output arrives at the position-proportional summing stage 114 to affect the summed amplitude as had been directed by the user. Using selectable resistor-inductor-capacitor (RLC) values or a programmable filter unit, shaper 116 contours pulses in such a way that they appear to be typical of conventional magnetic disk readback circuits. The pulse width (PW50) value is controlled by PC/AT CPU 92. The signal amplitude of head output 132 is typically 100 millivolts peak-to-peak differential. Head output 132 represents the simulated output of a targeted HDA and its pre-amp. Grey codes are held in a separate RAM and are loaded from the TRACKNUM file for embedded servo track data generation. They are substituted for the specially coded dummy pattern elements in the TRACK.TYP file.

For a closed loop operation mode, either an analog or digital position input from a drive electronics board is needed at inputs 134 or 136, respectively. If the digital input 136 is used, it is externally latched between examples. The eight bit digital signal is converted to analog. Filter 82 has characteristics that are selected via menus presented to the user to match the characteristics of the target HDA positioner mechanism. Two resonances, two poles plus a flexed pole at zero, one zero and filter gain are selectable. The conditioned analog position signal is fed to the position pulse generator 84, which produces up/down pulses proportional to the magnitude, direction and rate of change of the incoming positioner signal. The output of the position pulse generator 84 goes to the radial position counter 86. The remainder of the operation is about the same as in the open loop case, above.

Figure 5:
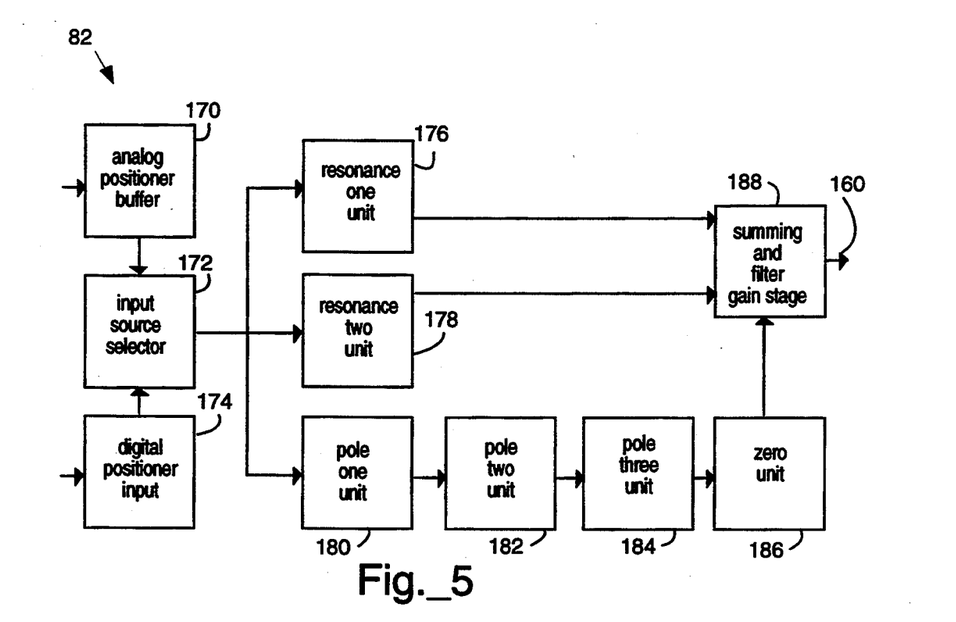
FIG. 5 is a block diagram of the position simulation filter used in the simulator of FIG. 3.

In FIG. 5, filter 82 is seen to comprise an analog positioner input buffer 170, an input source selector 172, a digital positioner input DAC 174, a resonance one unit 176, a resonance two unit 178, a pole one unit 180, a pole two unit 182, a pole three unit 184, a zero unit 186, and a summing and filter gain stage 188 that produces signal 160. Selector 172 is able to chose between an analog input from the target drive board at buffer 170 and a digital input from the target drive board at DAC 174 because DAC 174 converts the digital input to an analog voltage. Programmable internal analog electronic circuits simulate characteristics for closed loop operation. The parameters associated with two poles, two resonances, one zero, and overall gain are specified via menu selections and ultimately set resonance one unit 176, resonance two unit 178, pole one unit 180, pole two unit 182, pole three unit 184, zero unit 186, and summing and filter gain stage 188.

Support features include a trajectory plot function that is preferably also available in the closed loop mode. PC/AT CPU 92 reads the output of radial position counter 86 at pre-determined intervals, thus plotting position versus time.

Figure 6:
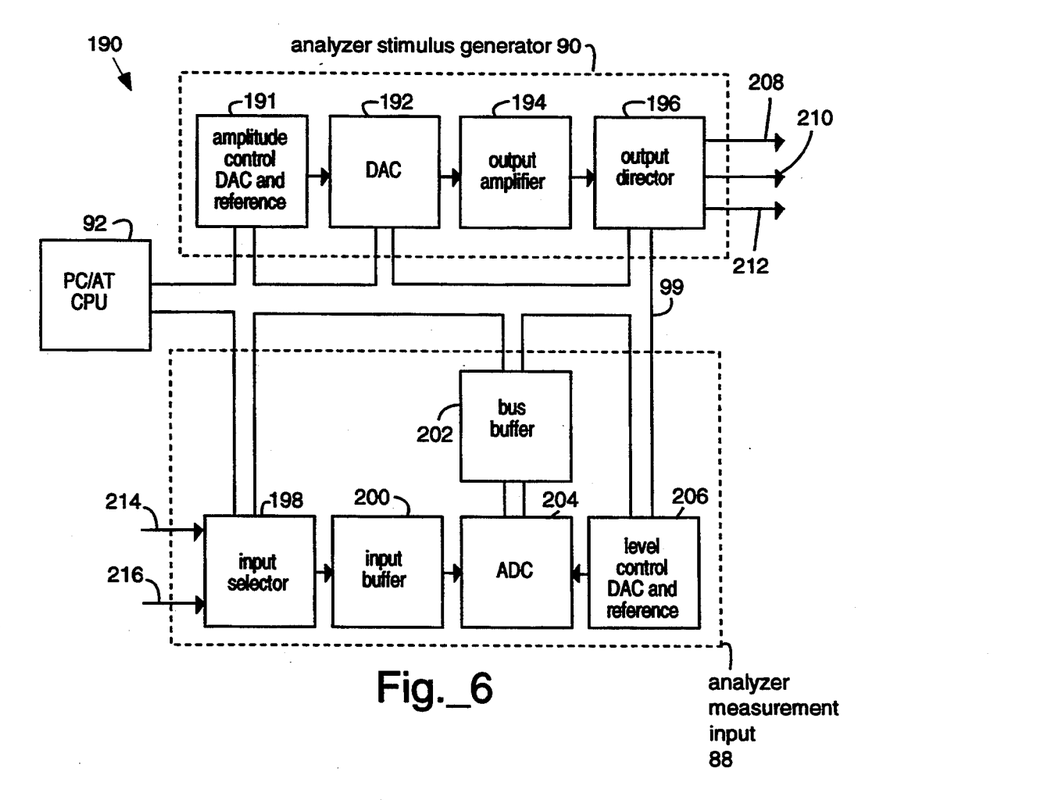
FIG. 6 is a block diagram of the analyzer used in the simulator of FIG. 3.

In FIG. 6, an analyzer 190, which implements the analyzer function referred to above, provides frequency response plots of circuit input versus output and is typically used to plot the response of the positioner simulation filter 82. Analyzer 190 comprises an amplitude control DAC and reference 191, a DAC 192, an output amplifier 194, an output director 196, an input selector 198, an input buffer 200, a bus buffer 202 connected to bus 99 and CPU 92, an analog-to-digital converter (ADC) 204, and a level control DAC and reference 206. A signal 208 is used as the input to the positioner simulation filter 82, a signal 210 provides the external measurement stimulus, and a signal 212 outputs the runout offset. A pair of inputs 214 and 216 receive an output of the positioner simulation filter 82 and the external measurement input, respectively. External measurements are also accommodated, via differential output (simulation) and input (circuit response). PC/AT CPU 92 simultaneously scales the analyzer stimulus amplitude and the analyzer input level, which are both dynamically scaled to get the maximum measurement without distortion. The characteristics of the input signal are monitored and the DAC 192 and ADC 204 gains and reference levels are adjusted. Stimulus generator 90 synthesizes an analog frequency-stepped sine wave that is digitally constructed by PC/AT CPU 92. Upper, lower and interval frequency range limits are selected from a closed-loop menu presented to the user (e.g., by display 70), PC/AT CPU 92 steps through the user selected range and sets the signal amplitude with DAC 192. Stimulus generator 90 generates runout, for both open and closed loop modes of operation. ADC 204 has its base level dynamically shifted by PC/AT CPU 92 through DAC 206, to guard against clipping of the input signal. Random noise can be inserted into shaper 116 from either an external source or noise generator 128. Write data from the drive electronics is captured digitally by acquisition unit 118. The write gate signal 140 is monitored separately as the acquisition event trigger. Any acquired data, which is synchronous with index, is injected into the output of the track generators 110 and 112. Up to one full track of write data can be captured. The internal variable clock 104 will ramp up and down to simulate spindle start/stop. The acceleration and deceleration rates for this are entered by the user in the SETUP file. The rate changes are also linked to a proportional amplitude change. This is implemented by an output from DAC 100 that controls the position-proportional summing stage 114 during simulated spin-up/spin-down cycles. The spindle motor simulator 120 accepts motor driver inputs from the drive board and outputs sequenced and delayed feedback pulses. Hall-output equivalent pulses are also preferably available. Signals from internal clocks 102 and 104 can be synchronized to a selected phase of the output of the spindle motor simulator 120. Interface control 122 provides a communication and control link to the drive board with an ST506, an ESDI, a SCSI or an AT-type interface. As such, complete stand-alone drive board testing is facilitated. Multi-board I/O multiplexer 130 allows up to ten drive boards to be simultaneously connected to HDA simulator 80 to enable volume production testing of the drive boards. Appropriate analog and digital multiplexers connect the required drive I/O points to HDA simulator 80. A pre-programmed set of test sequences preferably perform pass-fail tests on each drive board.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A head disk assembly (HDA) simulator, comprising:

a position pulse generator (84) connected to receive a conditioned analog position signal from a target drive board through a position simulation filter (82), the position pulse generator includes a reference frequency source (150) and a position pulse voltage controlled oscillator (VCO) (152) both connected as inputs to a rate comparator (154) for generating up and down pulse outputs, a feedback DAC (156) connected to control said VCO (152) and a feedback counter (158) connected between said feedback DAC (156) and said rate comparator (154) to sum said up and down pulse outputs, wherein said up/down pulses are output proportional to the magnitude, direction and rate of change of a positioner input signal (160);

a radial position counter (86) connected to the position pulse generator and an interconnect bus (99) for maintaining a micro-track simulated position that is available to a CPU (92);

a CPU (92) connected with said interconnect bus (99) to the radial position counter, an analyzer measurement input (88) and an analyzer stimulus generator (90) for controlling the radial position counter (86);

a pattern element random access memory (RAM) (94) connected to the microcomputer with said interconnect bus (99);

an eight-track RAM (96) connected to the microcomputer with said interconnect bus (99) and having means for storing data representations of eight individual tracks of data and servo recorded within a simulated head disk assembly;

a digital-to-analog converter (DAC) (100) connected to the radial position counter with said interconnect bus (99);

an internal crystal (XTAL) clock (102);

an internal variable clock (104);

a clock select and divider (106) including means for selectively connecting signals from an external clock input, the internal crystal (XTAL) clock (102) and the internal variable clock (104), and further including counter/divider means for dividing and outputting a selected one of said signals from said external clock, said internal crystal (XTAL) clock (102) and said internal variable clock (104);

a circumferential position counter (108) connected to the clock select and divider for accumulating a count that represents a circumferential position of the HDA;

a track "n" generator (110) connected to the circumferential position counter (108) and coupled to said interconnect bus (99);

a track "n+1" generator (112) connected to the circumferential position counter and coupled to said interconnected bus (99);

a position proportioning and summing stage (114) connected to outputs from the DAC (100), the track "n" generator (110) and the track "n+1" generator (112), for selecting the amplitudes for track "n" and track "n+1" data to be proportionally related to a radial position counter/runout input from the DAC (100), and for summing signals "n" and "n+1" wherein an output from the radial position counter (86) connected with said interconnect bus (99) to the position proportioning and summing stage (114) determines a track type to load from the eight-track RAM (96) into the track generators (110 and 112) and a proportion of "n" and "n+1" to be summed for a simulation of the head position;

a signal shaper (116) connected to the position proportioning and summing stage and for providing a simulated head analog output signal (132) that represents the simulated output of a targeted HDA and its pre-amp with embedded servo track data;

a modulation-defect-gain RAM (124) connected to the circumferential position counter and coupled to said interconnect bus (99);

a DAC (126) having an output to the position proportioning and summing stage and coupled to said interconnect bus (99) for generating a perturbation generator signal to influence the amplitudes for said track "n" and track "n+1" data in the position proportioning and summing stage (114);

a noise generator (128) having an output to the position proportioning and summing stage (114) for inserting random noise into the signal shaper (116); and a spindle motor simulator (120) with motor driver inputs from said target drive board and a sequenced output and a feedback output, for accepting motor driver inputs from said target drive board and for sequencing and delaying output feedback pulses and including synchronization means for selecting phase angles for spindle motor simulation.

2. The HDA simulator of claim 1, wherein:

the CPU (92) includes means for quantified track-to-track phase incoherence to be mimicked by delaying the output of one track, "n" or "n+1", with respect to the other;

the position proportioning and summing stage (114) includes means for selecting the amplitudes for track "n" and track "n+1" data to be proportionally related to the radial position counter/runout input from DAC (100) and to sum signals "n" and "n+1" and for the amplitudes to be further influenced by said perturbation generator signal input from DAC (126), wherein said perturbation generation supports modulation, media defect and overall gain artifact selections from a perturbation menu accessible by the CPU (92) under program control and loads a shift register with a summation of three types of perturbations, wherein said shift register is clocked by track data and such that the summation is in synchronism with track data and the output arrives at the position proportioning and summing stage (114) to affect the summed amplitude; and the signal shaper (116) includes at least one of a selectable resistor-inductor-capacitor (RLC) means and a programmable filter unit to contour output signal (132) pulses to appear to be typical of conventional magnetic disk readback circuits, wherein the pulse width (PW50) value is controlled by the CPU (92).

3. The HDA simulator of claim 1, further comprising:
a write data acquisition unit (118) connected to the position proportioning and summing stage for digital capture of write data from a drive electronics.

4. The HDA simulator of claim 1, further comprising:
a drive board interface controller (122) connected to the modulation-defect-gain RAM and providing for a communication and control link to said target drive board and having at least one of an ST506, an ESDI, a SCSI and an AT-type interface.

5. The HDA simulator of claim 1, further comprising:
a multi-board I/O multiplexer (130) connected to the drive board interface controller and providing for a plurality of target drive boards to be simultaneously connected to the HDA simulator so as to enable volume production testing of said target drive boards.

6. The HDA simulator of claim 1, wherein:
the radial position counter (86) includes means to determine appropriate track types to load from the eight-track RAM into the "n" and "n+1" track generators and the proportions of "n" and "n+1" to be summed for a simulation of the head position.

7. The HDA simulator of claim 1, wherein:
the clock selector and divider (106) includes means (108) for deriving circumferential tracking from one of said external clock, said internal high precision clock or said internal variable clock.

8. The HDA simulator of claim 7, further comprising:
means (106) for varying the rate of said clocks which allows simulation of an HDA spin-up/spin-down and spindle speed variations, wherein the selected clock is divided according to the desired rate and the length of each pattern element needed to build up the tracks.

9. The HDA simulator of claim 1, wherein:
the position-proportion and summing stage (114) includes track-to-track phase incoherence means for delaying the output of one track, "n" or "n+1", with respect to the other.

10. The HDA simulator of claim 1, wherein:
the perturbation generation (126) includes means for supporting modulation, media defect and overall gain artifact selections from a perturbation menu accessible by a user.

11. The HDA simulator of claim 1, wherein:
the signal shaper (116) includes means for selecting resistor-inductor-capacitor (RLC) values to contour pulses in such a way that said head output signal appears to be typical of a conventional magnetic disk readback circuit.

12. The HDA simulator of claim 1, further comprising:
conditioned analog position signal input means (82) connected to the position pulse generator for providing up/down pulses proportional to the magnitude, direction and rate of change of an incoming positioner signal.

13. The HDA simulator of claim 1, wherein:
the signal shaper (116) includes a programmable filter unit to contour pulses in such a way that said head output signal appears to be typical of a conventional magnetic disk readback circuit.

* * * * *